United States Patent [19]

Nagamine

[11] Patent Number: 5,509,087
[45] Date of Patent: Apr. 16, 1996

[54] DATA ENTRY AND WRITING DEVICE

[75] Inventor: Kimihiro Nagamine, Fussa, Japan

[73] Assignee: Casio Computer Co., Ltd., Tokyo, Japan

[21] Appl. No.: 455,596

[22] Filed: May 31, 1995

Related U.S. Application Data

[63] Continuation of Ser. No. 134,478, Oct. 8, 1993, abandoned, which is a continuation of Ser. No. 833,968, Feb. 11, 1992, abandoned.

[30] Foreign Application Priority Data

Feb. 28, 1991 [JP] Japan .................. 3-058182

[51] Int. Cl.$^6$ .................................. G06K 9/00
[52] U.S. Cl. .............. 382/188; 382/189; 382/309; 178/18
[58] Field of Search ................. 382/188, 189, 382/309, 325; 178/18, 19; 341/31; 364/709.06, 709.11, 705.03, 705.02

[56] References Cited

U.S. PATENT DOCUMENTS

| | | | |
|---|---|---|---|
| 3,487,371 | 12/1969 | Frank | 382/13 |
| 4,070,649 | 1/1978 | Wright, Jr. et al. | 364/709.11 |
| 4,151,596 | 4/1979 | Howells | 364/709.11 |
| 4,281,313 | 7/1981 | Boldridge, Jr. | 382/3 |
| 4,888,479 | 12/1989 | Tamura | 341/31 |
| 4,905,174 | 2/1990 | Ouchi | 364/709.11 |
| 4,945,504 | 7/1990 | Nakama et al. | |
| 5,107,253 | 4/1992 | Meadows | 345/175 |
| 5,194,863 | 3/1993 | Barker et al. | 345/175 |

OTHER PUBLICATIONS

J. H. Morrissey, "Elec. Calculator Based on Character Recognition of Input From Stylus Acceleration Dynamics", Dec. 1976, IBM Disclosure Bulletin.

*Primary Examiner*—Stephen Chin
*Assistant Examiner*—Timothy S. May
*Attorney, Agent, or Firm*—Frishauf, Holtz, Goodman, Langer & Chick

[57] ABSTRACT

A data entry and writing device is equipped with an optical detector comprising light emitting elements and light receiving elements disposed around an opening formed in the device, a character/graphic analyzer for analyzing the locus of a pen which is moved within the opening using time-series coordinate data to thereby perform character/graphic recognition and a display unit for displaying data entered through the character recognition. The data entry and writing device is placed on a form and data are handwritten on the form with the pen through the opening. This permits automatic data entry into the device and data is also displayed on the display unit. The device also includes an erroneous preventing circuit which automatically indicates where errors exist between the data entered by the pen and data processed by the device and guides a user to correct the errors.

8 Claims, 5 Drawing Sheets

FIG. 3A

| ITEM | UNIT PRICE | QUANTITY | TOTAL |
|---|---|---|---|
| CALCULATOR | 1,280 | 37 | 47,360 |

FIG. 3B

| ITEM | UNIT PRICE | QUANTITY | TOTAL |
|---|---|---|---|
| CALCULATOR | 1,280 | | |

FIG. 3C

| ITEM | UNIT PRICE | QUANTITY | TOTAL |
|---|---|---|---|
| CALCULATOR | 1,280 | 37 | |

| ITEM | UNIT PRICE | QUANTITY | TOTAL |
|---|---|---|---|
| CALCULATOR | 1,280 | 37 | 47,360 |

FIG. 5A

| ITEM | UNIT PRICE | QUANTITY | TOTAL |
|---|---|---|---|
| CALCULATOR | 1,280 | 37 | 47,360 |

FIG. 5B

| ITEM | UNIT PRICE | QUANTITY | TOTAL |
|---|---|---|---|
| CALCULATOR | 1,280 | | |

FIG. 5C

| ITEM | UNIT PRICE | QUANTITY | TOTAL |
|---|---|---|---|
| CALCULATOR | 1,280 | 37 | |

| ITEM | UNIT PRICE | QUANTITY | TOTAL |
|---|---|---|---|
| CALCULATOR | 1,280 | 37 | 47,360 |

FIG. 5F

DATA ENTRY AND WRITING DEVICE

This application is a Continuation, of application Ser. No. 08/134,478, filed Oct. 8, 1993, abandoned which is a Continuation of Ser. No. 07/833,968, filed Feb. 11, 1992 (ABANDONED).

BACKGROUND OF THE INVENTION

1. Field of the Invention

The present invention relates to a device for entering data through character recognition.

2. Description of the Related Art

The recent developments of signal processing technology have enabled data entry into media to be replaced with direct entry of documents. Types of direct entry of documents include entry of the presence or absence of marks on documents and entry of characters and symbols on documents through recognition and coding thereof. A character recognition apparatus is generally referred to as an optical character reader (OCR), which reads printed or handwritten characters on a document by means of an optical scanner and codes them in the form of computer-usable input after recognition processing. An online handmade character entry device which can recognize characters in real time by the use of information about the order of making strokes in writing a Chinese character and the number of its strokes is also a type of character recognition apparatus.

With a conventional online handwritten-character recognition device, a character is written on a dedicated tablet (XY coordinate entry device) and the handwritten-character is recognized in real time by the use of time-series data on XY coordinates of the positions of a pen which are detected by the tablet.

However, such a character recognition device suffers from a drawback that a dedicated tablet on which characters to be recognized are written must be used for character recognition and thus the characters must be transcribed onto a specific form even if data entry into the device has been terminated. Thus, data entry into a computer and transcription of data onto a form like a slip must be performed separately. This is very time-consuming.

SUMMARY OF THE INVENTION

It is an object of the present invention to provide a data entry and writing device which permits writing of characters on a form and data entry into a computer to be performed simultaneously.

In order to achieve the above object, according to the first aspect of the present invention, there is provided a portable data entry and writing device comprising: detecting means, having an opening, for detecting the movement of a writing implement which is used to enter data in a recording medium through the opening; data analyzing means for analyzing the data entered in the recording medium on the basis of the movement of the writing implement detected by the detecting means; processing means for receiving analyzed data from the data analyzing means as input data and performing processing including arithmetic operations of the input data; and display means for displaying data processed by the processing means.

In order to achieve the above object, according to the second aspect of the present invention, there is provided a data entry and writing device comprising: optical detecting means, disposed on a recording medium in which data are to be entered, for optically detecting the movement of a writing implement which is used to write data on the recording medium; recognizing means for recognizing data entered in the recording medium on the basis of the movement of the writing implement detected by the optical detecting means; processing means for receiving recognized data as data for processing and performing processing including arithmetic operations on the data; and displaying means for displaying data processed by the processing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A through 3E illustrate the procedure for entering in a cut-form of slip and data entry using the data entry and writing device;

FIGS. 5A through 5F illustrate the procedure for entering in a cut-form and data entry using the data entry and writing device of FIG. 4.

DETAILED DESCRIPTION OF THE PREFERRED EMBODIMENTS

Figure 1:
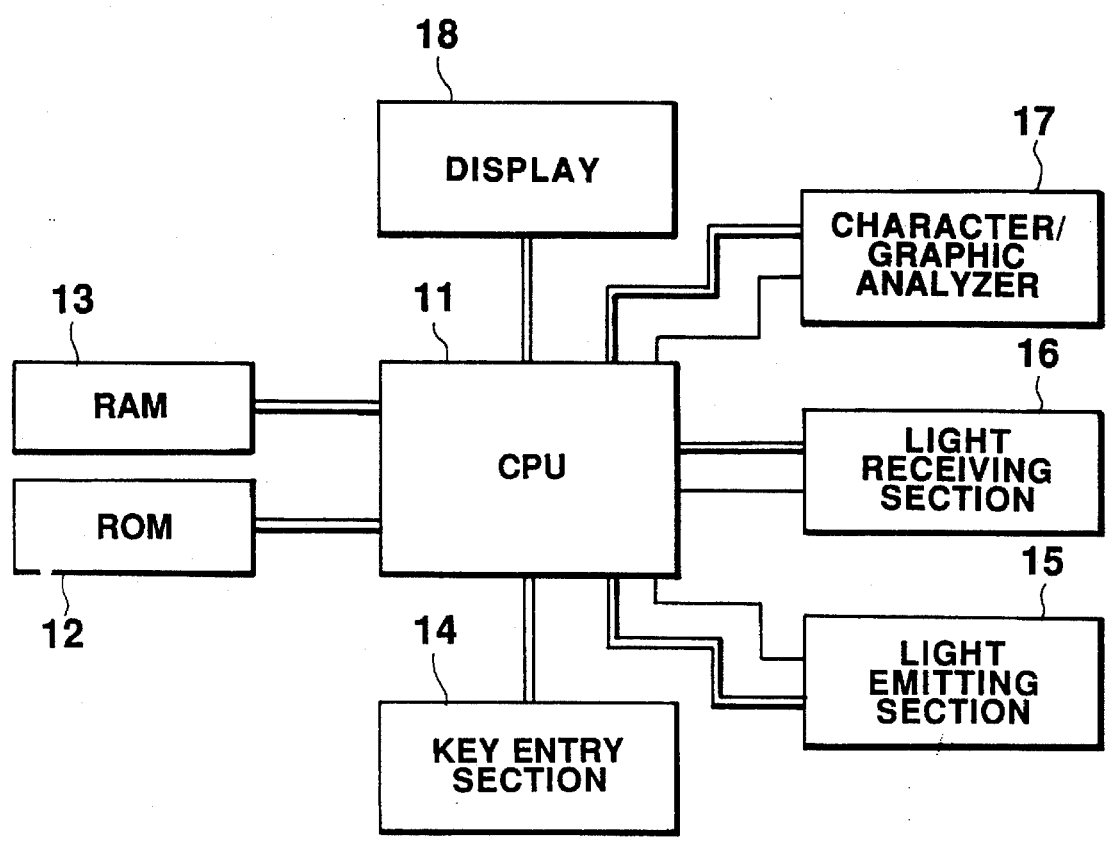
FIG. 1 is a block diagram of a data entry and writing device according to a first embodiment of the present invention.
Figure 2:
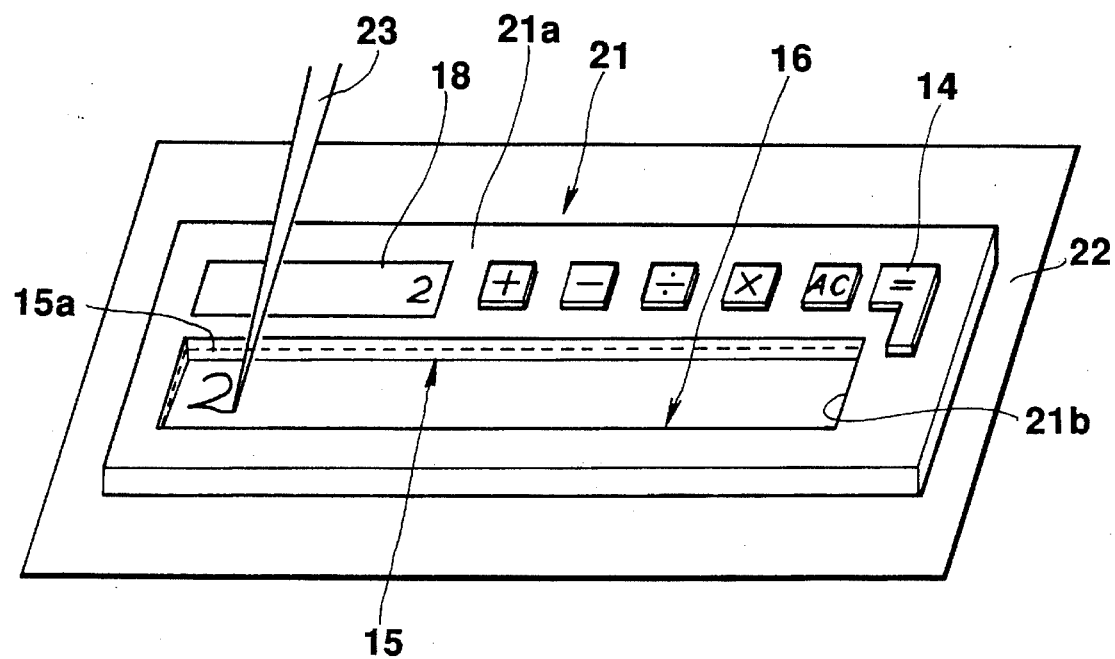
FIG. 2 illustrates a state where the data entry and writing device is used.

FIGS. 1 through 3 illustrate a first embodiment of a data entry and writing device.

Referring now to FIG. 1, the data entry and writing device includes a CPU 11 which performs control of the entire device and various types of data processing including character recognition processing to be described later and data arithmetic processing. The CPU 11 controls the operations of the data entry and writing device in accordance with a microprogram stored in a ROM 12 which will be described later. To the CPU 11 are connected the ROM 12 which stores a predetermined program and fixed data; a RAM 13 which temporarily stores data used for calculations and results of calculations; a key entry section 14 which is equipped with various arithmetic function keys and mode set keys; a light emitting section 15 which comprises a plurality of light emitting elements arranged in one row and one column; a light receiving section 16 which comprises a plurality of light receiving elements arranged in the an other row and an other column, each light receiving element facing a corresponding one of the light emitting elements of the light emitting section 15 to receive light emitted therefrom; a character/graphic analyzer 17 which makes an analysis of the locus of the tip of a pen, which is moved in the space formed between the light emitting section 15 and the light receiving section 16, using time-series data to thereby perform character/graphic recognition; and a display unit 18 for visually displaying data indicating the results of the character/graphic recognition.

FIG. 2 is a perspective view of the data entry and writing device which is in the state of use. In the figure, 21 denotes the data entry and writing device having a character recognition device, 22 denotes a cut-form or slip in which characters, numeric values, etc., are entered, and 23 denotes a pen used to write or enter characters, figures, etc., in the cut-form 22. The data entry and writing device 21 can be placed in any desired position on the cut-form 22. The main body 21a of the data entry and writing device 21 has a rectangular opening 21b formed therein which serves as a window adapted for character entry and recognition. That is, characters and figures can be written on the cut-form with a writing implement such as a pen through the window 21b. A plurality of light emitting elements (e.g., light emitting diodes) 15a, serving as the light emitting section 15, are arranged in the shape of the letter L on a long inner surface and a short inner surface of the rectangular opening 21b. On the other hand, a plurality of light receiving elements (e.g., phototransistors), which serves as the light receiving section 16 and each of which is adapted to receive light from a corresponding one of the light emitting elements 15a, are arranged in the shape of the reverse letter of L on another long inner surface and another short inner surface of the rectangular opening 21b. Thus, when the pen 23 is inserted into the opening 21b, its XY coordinates can be detected and the locus of the tip of the pen indicating a character, etc., can be analyzed by reading the XY coordinates of the pen at intervals of time. This enables handwritten characters to be recognized.

There are provided the display section 18 (e.g., liquid crystal display) for displaying input data and results of calculations and a key entry section 14 comprising arithmetic function keys which are pressed when arithmetic symbols are not required to be entered in the cut-form 22 under the opening 21b of the main body 21a. The data entry and writing device 21 is powered from a built-in battery (a solar battery may also be used at the same time) and thus has portability to permit its use in any desired place.

Next, the operation of the data entry and writing device 21 configured as described above will be described.

FIGS. 3A through 3E are diagrams for use in explanation of the operation of entry in the cut-form 22 and data entry into the device. Each figure illustrates a stage of entry in the cut-form.

Suppose now that a cut-form consisting of four columns (fields) of "item (product name)"; "unit price"; "quantity"; and "total" is prepared as shown in FIG. 3A.

First, as shown in FIG. 3A, the data entry and writing device 21 is placed on a cut-form on which a product name is printed with its opening (character writing section/character recognition section) 21b set on the fields of "item", "quantity", and "total". In this state, "1,280" is entered in the field of "unit price" by using the pen 23. Then, characters being written, which are indicated by the loci of the movement of the pen 23, are detected by the light emitting section 15 whose elements are arranged in the shape of the letter L and the light receiving section 16 whose elements are arranged in the shape of the inverse L and the results of the detection are analyzed by the character/graphic analyzer 17, whereby character recognition is performed. A character subjected to the character recognition is entered into the CPU 11 as character data and displayed on the display section 18 in real time. The real-time data display allows the user to immediately make sure that the characters have been recognized correctly. This will prevent making an error in data entry. However, even if an error is made in entry of character data or character data cannot be recognized correctly, a suitable correcting method can be used. For example, a negation line may be entered or data entry may be made over again from the beginning.

After the entry of the unit price, the quantity will be entered. Since the total is the product of the unit price and the quantity, the "x" key is pressed to command multiplication after the entry of the unit price. Here, the arithmetic symbol "X" may be entered in the form with the pen to enter the multiplication instruction into the CPU 11 instead of pressing the "X" key. However, since there is no need of entering the arithmetic symbol "X" in the actual cut-form 22, the arithmetic function key is used to instruct the CPU to perform multiplication.

Subsequently, the quantity "37" is entered in the "quantity" field of the cut-form 22 by using the pen 23. The loci of the movement of the pen are likewise analyzed, so that "37" is displayed on the display section 18 as shown in FIG. 3C.

Subsequently, the "=" key ("Enter" key) is pressed, so that "47,360", the result of multiplication performed by the CPU 11, is displayed on the display section 18 as shown in FIG. 3D.

When the result of calculation, "47,360", displayed by the display section 18 is entered in the "total" field of the cut-form 22 by using the pen 23, the entry in the cut-form and the data entry into the computer are terminated simultaneously. This simultaneous data entry in the cut-form and into the computer lightens operator's work.

According to the first embodiment of the present invention, as described above, the opening 21b, which is formed in the main body 21a, is equipped with the light emitting section 15 and the light receiving section 16. Characters which are handwritten on the cut-form 22 through the opening 21b by using the pen 23 are read into the computer. The data entry into the data entry and writing device 21 is completed at the same time characters are directly written on the cut-form 22 and the input character data and the result of calculation are immediately displayed on the nearby display section 18. Thus, the writing of characters on the cut-form 22 functions as data entry into the data input writing device 21. This can save time and labor to enter character data, which were written on a form once, into the data entry and writing device 21 again by using keys and thus can prevent making an error in key entry, thereby producing a significant improvement in operability.

Figure 4:
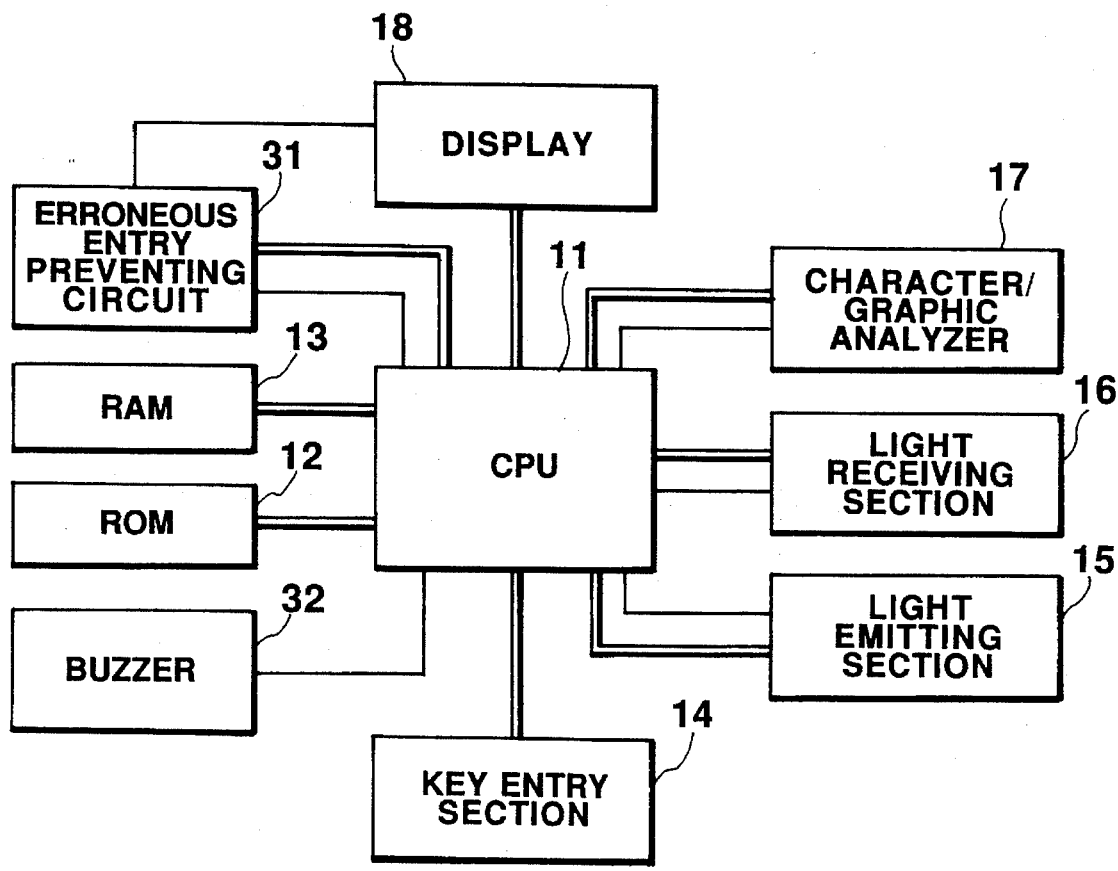
FIG. 4 is a block diagram of a data entry and writing device according to a second embodiment of the present invention.

FIGS. 4 and 5 illustrate a data entry and writing device according to a second embodiment of the present invention. In the figures, corresponding parts to those in FIGS. 1 and 2 are designated by like reference numerals and thus descriptions thereof are omitted.

In the arrangement of FIG. 4, an erroneous entry preventing circuit 31 and a buzzer 32 are added to the data entry and writing circuit of FIG. 1. The erroneous entry preventing circuit 31 and the buzzer 32 adds a feature which ensures users quick recognition of an erroneously entered portion and eases re-entry of data with the writing device of the first embodiment having the character recognition feature.

In the above arrangement, steps of entry in a cut-form are illustrated in FIGS. 5A through 5F.

FIGS. 5A through 5C are the same as FIGS. 3A through 3C. When the "=" key is pressed in order to obtain the result of calculation, a calculation is performed by the CPU 11 and then the result of the calculation, "47,360", is displayed reversed on the display section 18 as shown in FIG. 5D.

Next, the user enters the result of the calculation in the "total" field while looking at "47,360" displayed reversed on the display section 18. In the present embodiment, each time a character is entered, it is recognized and checked with a corresponding displayed character by the erroneous entry preventing circuit 31. If an erroneous character is entered, the buzzer 32 sounds and the corresponding displayed character remains reversed. When the character is entered correctly, the displayed character is displayed normally. That is, when the user enters in the "total" field while looking at the reverse-displayed calculation result, the erroneous entry preventing function is performed for entry after the press of the "=" key and the reverse display is returned to the normal display each time an entered character is checked with the corresponding displayed character to determine its validity. For example, when entry is made up to "47", the display will be "47,360" (the underlined portion indicates the reverse display). If all the characters are entered correctly, the result of the calculation will be displayed normally as shown in FIG. 5E.

FIG. 5F shows an example in which two characters have been entered erroneously in the entry of "total". When "47,360" is entered erroneously as "46,350", the buzzer sounds each time an error is made and the total will partly be reversed as "47,360". This will allow the user to recognize erroneously entered portions and correct characters with ease.

As described above, in addition to the advantages of the first embodiment, the second embodiment of the present invention allows the user to recognize erroneously entered portions immediately and re-enter them with ease.

According to the present invention, the entry of data for calculations is completed and the data is displayed at the same time the data is entered in a form which is an object of writing by the user. That is, the writing characters, etc., on the form by the user serve as data entry into the device and the need for re-entry of data by using keys is eliminated, thus preventing making errors in key entry and providing a significant improvement in operability.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable data recognizing and entry device for recognizing and entering data written on a recording medium positioned beneath said device, comprising the combination of:

a plate shaped main body having an opening formed entirely through said main body, said opening being defined by inner side walls of said main body in surrounding relation to said opening, said main body including a display section offset from said opening and a key-type input section offset from said opening, said display section and said key-type input section being integral with said main body;

optical detecting means, positioned at said inner side walls which define said opening so as to surround said opening of said main body, for optically detecting a position of an ordinary writing implement that is used to enter the data written on said recording medium through said opening as said ordinary writing implement writes on said recording medium, when said main body is placed on said recording medium and said recording medium is accessible by said ordinary writing implement through said opening;

data recognizing means, incorporated in said main body, for analyzing a locus of movement of said ordinary writing implement within said opening based on said position of said ordinary writing implement detected by said optical detecting means, and for recognizing the data written on said recording medium by said ordinary writing implement as input data;

processing means, incorporated in said main body, for receiving data recognized as input data by said data recognizing means; for performing processing, including arithmetic operations, on the recognized input data to produce processed input data; and for causing said display section to display processed input data; and erroneous entry preventing means including means for checking whether errors exist between the processed input data and the data written by said ordinary writing implement on said recording medium, and means for automatically indicating where the errors exist.

2. A device according to claim 1, wherein said key-type input section includes a plurality of keys for inputting a plurality of arithmetic operation instruction data to said processing means.

3. A device according to claim 1, wherein:

said data recognizing means includes means for recognizing arithmetic operation instruction data written on said arbitrary recording medium; and said processing means includes means for executing an arithmetic operation based on said recognized arithmetic operation instruction data.

4. A device according to claim 1, wherein said detecting means comprises light emitting elements and light receiving elements positioned at said inner side walls so as to be disposed around said opening in said main body.

5. The device according to claim 1, wherein said ordinary writing implement comprises a pen.

6. A portable data recognizing and entry device for recognizing and entering data written on a recording medium positioned beneath said device, comprising the combination of:

a main body including:
a display section,
a key-type input section,
an arithmetic processing section,
said display section, key-type input section and arithmetic processing section all being integral with one another, and
an opening formed entirely through said main body, said opening being defined by inner side walls of said main body in surrounding relation to said opening, and said opening being offset from said display section, key-type input section and arithmetic processing section, optical detecting means, positioned at said inner side walls which define said opening so as to surround said opening, for optically detecting a position of an ordinary writing implement that is used to write data on a recording medium through said opening, when said main body is placed on said recording medium and said recording medium is accessible by said ordinary writing implement through said opening;

recognizing means, incorporated in said device, for recognizing data written on said recording medium, in accordance with a locus of movement of said ordinary writing implement within said opening and based on said position of said ordinary writing implement detected by said optical detecting means;

said key-type input section including means for inputting an arithmetic operation instruction, and in response to which an arithmetic operation is performed on the recognized data by said arithmetic processing section to provide processed recognized data; and erroneous entry preventing means for providing both an audible and a visual error indication when errors exist between the processed recognized data and data written by said ordinary writing implement on said recording medium and for automatically indicating where the errors exist.

7. A device according to claim 6, wherein the erroneous entry preventing means includes:

means for checking said processed recognized data displayed on said display section with said data written on the recording medium, and wherein a result of said checking is displayed by said display section to automatically indicate where the errors exist.

8. The device according to claim 6, wherein said ordinary writing implement comprises a pen.

\* \* \* \* \*